(12) United States Patent
Lee

(10) Patent No.: US 11,535,218 B2
(45) Date of Patent: Dec. 27, 2022

(54) BRAKING APPARATUS OF VEHICLE AND CONTROL METHOD THEREOF

(71) Applicant: HYUNDAI MOBIS CO., LTD., Seoul (KR)

(72) Inventor: Jee Sang Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 452 days.

(21) Appl. No.: 16/731,909

(22) Filed: Dec. 31, 2019

(65) Prior Publication Data
US 2020/0216048 A1 Jul. 9, 2020

(30) Foreign Application Priority Data

Jan. 3, 2019 (KR) .......................... 10-2019-0000596

(51) Int. Cl.
*B60T 17/22* (2006.01)
*B60T 8/94* (2006.01)
*B60T 8/171* (2006.01)
*B60T 8/40* (2006.01)
*B60T 13/74* (2006.01)

(52) U.S. Cl.
CPC ................ *B60T 8/94* (2013.01); *B60T 8/171* (2013.01); *B60T 8/4072* (2013.01); *B60T 13/748* (2013.01); *B60T 17/221* (2013.01); *B60T 2270/403* (2013.01)

(58) Field of Classification Search
CPC ...... B60T 13/686; B60T 13/74; B60T 13/745; B60T 2270/402; B60T 2270/403; B60T 2270/404; B60T 2270/406; B60T 17/221
See application file for complete search history.

(56) References Cited

U.S. PATENT DOCUMENTS

| | | | | |
|---|---|---|---|---|
| 6,450,591 | B1 * | 9/2002 | Kawahata | B60T 8/3655 303/122.05 |
| 6,476,515 | B1 * | 11/2002 | Yamamoto | B60T 7/042 307/9.1 |
| 7,673,948 | B2 * | 3/2010 | Otomo | B60T 8/4081 303/114.1 |
| 8,007,056 | B2 * | 8/2011 | Ohkubo | B60T 17/22 303/191 |

(Continued)

FOREIGN PATENT DOCUMENTS

KR 10-2008-0044300 5/2008

*Primary Examiner* — Bradley T King
(74) *Attorney, Agent, or Firm* — H.C. Park & Associates, PLC

(57) ABSTRACT

A braking apparatus of a vehicle including: a brake pedal position detector configured to detect a position of a brake pedal; a piston displacement detector configured to detect a displacement of a piston installed in a main master cylinder; a rear wheel circuit pressure detector configured to detect pressure supplied to a rear wheel circuit; a front wheel circuit pressure detector configured to detect pressure supplied to a front wheel circuit; a motor driver configured to drive a motor to move the piston; and a controller configured to receive the position of the brake pedal, the displacement of the piston, rear wheel circuit pressure and front wheel circuit pressure, determine a fail of a circuit isolation valve, and perform fail safe driving by operating the motor driver and a normal operating valve to supply pressure to only one of the rear wheel circuit and the front wheel circuit.

8 Claims, 4 Drawing Sheets

(56) References Cited

U.S. PATENT DOCUMENTS

| | | | | |
|---|---|---|---|---|
| 8,888,197 | B2 * | 11/2014 | Miyazaki | B60T 8/94 303/122.1 |
| 9,776,605 | B2 * | 10/2017 | Miyazaki | B60T 8/4081 |
| 10,124,783 | B2 * | 11/2018 | Spieker | B60T 13/662 |
| 10,293,798 | B2 * | 5/2019 | Johnson | B60T 13/686 |
| 2008/0084107 | A1 * | 4/2008 | Yanai | B60W 30/18109 701/70 |
| 2008/0257670 | A1 | 10/2008 | Drumm et al. | |
| 2009/0315391 | A1 * | 12/2009 | Tanaka | B60T 8/4081 303/113.5 |
| 2011/0175436 | A1 * | 7/2011 | Nakata | B60T 8/4081 303/6.01 |
| 2015/0166029 | A1 * | 6/2015 | Yamasaki | B60T 8/4081 303/14 |
| 2015/0266457 | A1 * | 9/2015 | Johnson | B60T 7/042 303/15 |
| 2016/0167631 | A1 * | 6/2016 | Miyazaki | B60T 8/17 701/70 |
| 2016/0264113 | A1 * | 9/2016 | Feigel | B60T 8/4086 |
| 2018/0215366 | A1 * | 8/2018 | Leiber | B60T 8/17 |
| 2018/0297574 | A1 * | 10/2018 | Zimmermann | B60T 8/4081 |
| 2019/0232935 | A1 * | 8/2019 | Kim | B60T 13/686 |
| 2019/0275997 | A1 * | 9/2019 | Park | B60T 13/18 |
| 2019/0344769 | A1 * | 11/2019 | Zimmermann | B60T 7/042 |
| 2019/0366997 | A1 * | 12/2019 | Jeong | B60T 13/745 |
| 2020/0114894 | A1 * | 4/2020 | Leiber | B60T 13/745 |
| 2020/0216052 | A1 * | 7/2020 | Campau | B60T 13/662 |
| 2020/0307538 | A1 * | 10/2020 | Ganzel | B60T 8/4081 |
| 2020/0339096 | A1 * | 10/2020 | Timm | B60T 13/686 |
| 2020/0406880 | A1 * | 12/2020 | Zimmermann | B60T 17/221 |
| 2021/0031742 | A1 * | 2/2021 | Drotleff | B60T 13/686 |
| 2021/0053540 | A1 * | 2/2021 | Besier | B60T 8/885 |
| 2021/0122349 | A1 * | 4/2021 | Leiber | B60T 7/042 |
| 2021/0146908 | A1 * | 5/2021 | Ganzel | B60T 13/745 |
| 2022/0055582 | A1 * | 2/2022 | Takimoto | G05G 1/38 |
| 2022/0055592 | A1 * | 2/2022 | Leiber | B60T 13/588 |
| 2022/0126806 | A1 * | 4/2022 | Leiber | B60T 13/686 |
| 2022/0135013 | A1 * | 5/2022 | Leiber | B60T 13/686 303/6.01 |

* cited by examiner

BRAKING APPARATUS OF VEHICLE AND CONTROL METHOD THEREOF

CROSS-REFERENCE TO RELATED APPLICATION

This application claims priority from and the benefit of Korean Patent Application No. 10-2019-0000596, filed on Jan. 3, 2019, which is hereby incorporated by reference for all purposes as if set forth herein.

BACKGROUND

Field

Exemplary embodiments of the present disclosure relate to a braking apparatus of a vehicle and a control method thereof, and more particularly, to a braking apparatus of a vehicle, which can detect a fail of a circuit isolation valve for distributing hydraulic pressure to a front wheel circuit and a rear wheel circuit in an electric-booster braking system, and perform fail safe driving to improve braking reliability, and a control method thereof.

Discussion of the Background

In general, an electric-booster brake system maintains the most part of the braking mechanism of an existing vacuum booster. However, the electric-booster brake system is different in distribution mechanism from the vacuum booster in that the electric-booster brake system distributes braking pressure using a force of the electric booster (or motor) which uses electrical energy, instead of distributing braking pressure based on a pressure difference between air pressure and vacuum pressure, like a vacuum booster.

The electric-booster brake system may be divided into two types of systems depending on whether a pedal simulator is mounted.

The electric-booster brake system having a pedal simulator mounted therein blocks a pedal force of a driver, which is generated when the driver steps on a brake pedal, and performs braking using only the force of the electric booster. The electric-booster brake system makes the driver have a pedal feel similar to a pedal feel which an existing vacuum-booster brake system has provided to a driver using a reaction force generated by a rubber damper or spring of the pedal simulator.

On the other hand, the electric-booster brake system having no pedal simulator mounted therein forms a pedal feel of a driver while having a part of a braking force covered by a pedal force of the driver. For example, when the distribution force ratio of the electric booster is 10:1, 10% of the entire braking force is covered by the pedal force of the driver, and 90% of the entire braking force is covered by the electric booster. That is, the electric-booster brake system having no pedal simulator mounted therein forms a pedal feel of a driver by having a part of the entire braking force covered by the pedal force of the driver.

The related art is disclosed in Korean Patent Application Laid-Open No. 10-2008-0044300 published on May 20, 2008 and entitled "Vehicle Braking System".

Such an electric-booster brake system is roughly constituted by an actuator part and a hydraulic pressure modulation part, and serves to isolate a hydraulic pressure circuit at each position during normal driving, such that pressure formed by a brake pedal connected to an auxiliary master cylinder can be transferred to a wheel, while the electric-booster brake system is electrically backed up through a plurality of normal open valves, normal close valves and normal operating valves. Thus, pressure formed by forward movement of the piston by rotation of the motor in a main master cylinder can be transferred to each wheel.

A circuit isolation valve which is a normal close valve serving to isolate a front wheel circuit from a rear wheel circuit is closed while electrically backed up, and opened to evenly apply the pressures of the front wheel circuit and the rear wheel circuit while normally driven. Furthermore, when a mechanical fault (mainly oil leakage) occurs in one circuit, braking may be performed through the other circuit.

However, when the circuit isolation valve is closed due to an electrical fault in a general driving situation or always closed for another reason, the electric-booster brake system may not recognize the corresponding situation, but maintain normal pressure control and drive the motor to move the piston forward according to a user's brake pedal input.

When the circuit isolation valve is closed to supply brake oil to only one rear wheel circuit, pressure control is tuned to the required amount of brake oil supplied to a four-wheel caliper. Thus, pressure dissipation occurs. For example, when the current required amount of brake oil is smaller than the amount of brake oil required for four-wheel tuning, excessive control dissipation or pressure vibration may occur. At this time, as the circuit isolation valve is closed, the brake oil is not transferred to the front wheel circuit, and the wheel pressure of the front wheel circuit stays around 0[Bar] even though a user has a braking intention. At this time, the brake oil supplied to the rear wheel circuit may not be normally supplied to the wheel while the brake oil is repeatedly inputted and outputted through the reciprocation of the piston from the initial position. Thus, the pressure of the rear wheel circuit is not normally formed. Therefore, a situation in which braking is impossible may occur from the viewpoint of the entire four wheels. In a severe case, when the piston repeatedly and continuously collides with the end at a position of O[mm], the pressure forming structure including a screw may be damaged.

The above information disclosed in this Background section is only for enhancement of understanding of the background of the invention and, therefore, it may contain information that does not constitute prior art.

SUMMARY

Exemplary embodiments of the present invention are directed to a braking apparatus of a vehicle, which can detect a fail of a circuit isolation valve for distributing hydraulic pressure to a front wheel circuit and a rear wheel circuit in an electric-booster braking system, and perform fail safe driving to improve braking reliability, and a control method thereof.

In an embodiment, a braking apparatus of a vehicle may include: a brake pedal position detector configured to detect a position of a brake pedal; a piston displacement detector configured to detect a displacement of a piston installed in a main master cylinder; a rear wheel circuit pressure detector configured to detect pressure supplied to a rear wheel circuit; a front wheel circuit pressure detector configured to detect pressure supplied to a front wheel circuit; a motor driver configured to drive a motor to move the piston; and a controller configured to receive the position of the brake pedal from the brake pedal position detector, receive the displacement of the piston, the rear wheel circuit pressure and the front wheel circuit pressure from the piston displacement detector, the rear wheel circuit pressure detector and the front wheel circuit pressure detector, respectively, when a brake is operated, determine a fail of a circuit isolation valve that distributes pressure to the front wheel circuit between the rear wheel circuit and the front wheel circuit, and perform fail safe driving by operating the motor driver and a normal operating valve to supply pressure to only one of the rear wheel circuit and the front wheel circuit.

When the rear wheel circuit pressure is dissipated and the front wheel circuit pressure is less than a threshold pressure, the controller may determine that the circuit isolation valve failed.

The controller may count the number of times that the ratio of an increase in pressure of the rear wheel circuit to a change in displacement of the piston is increased to a threshold value or more with the piston moved forward, and determine whether the rear wheel circuit pressure is dissipated.

The controller may generate a fail determination flag after determining the fail of the circuit isolation valve.

The circuit isolation valve may supply pressure to the rear wheel circuit in a normal closed state, and distribute pressure to the front wheel circuit, if necessary.

In an embodiment, a control method of a braking apparatus of a vehicle may include: receiving, by a controller, a position of a brake pedal, and determining an operation state of a brake; determining, by the controller, a fail of a circuit isolation valve for distributing pressure to a front wheel circuit between a rear wheel circuit and the front wheel circuit, when the brake is operated; and performing, by the controller, fail safe driving by operating a motor driver and a normal operating valve such that pressure is supplied to only one of the rear wheel circuit and the front wheel circuit, depending on the fail state of the circuit isolation valve.

The determining of the fail of the circuit isolation valve may include receiving, by the controller, a displacement of a piston, rear wheel circuit pressure and front wheel circuit pressure from a piston displacement detector, a rear wheel circuit pressure detector and a front wheel circuit pressure detector, respectively, and determining that the circuit isolation valve failed, when the rear wheel circuit pressure is dissipated and the front wheel circuit pressure is less than a threshold pressure.

The controller may count the number of times that the ratio of an increase in pressure of the rear wheel circuit to a change in displacement of the piston is increased to a threshold value or more with the piston moved forward, and determine whether the rear wheel circuit pressure is dissipated.

The determining of the fail of the circuit isolation valve may further include generating, by the controller, a fail determination flag after determining the fail of the circuit isolation valve.

The circuit isolation valve may supply pressure to the rear wheel circuit in a normal closed state, and distribute pressure to the front wheel circuit, if necessary.

In accordance with the embodiments of the present disclosure, the brake apparatus of a vehicle and the control method thereof may detect a fail of the circuit isolation valve for distributing hydraulic pressure to the front wheel circuit and the rear wheel circuit in the electric-booster brake system, and perform fail safe driving to improve the braking reliability and performance even when a fail occurred It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
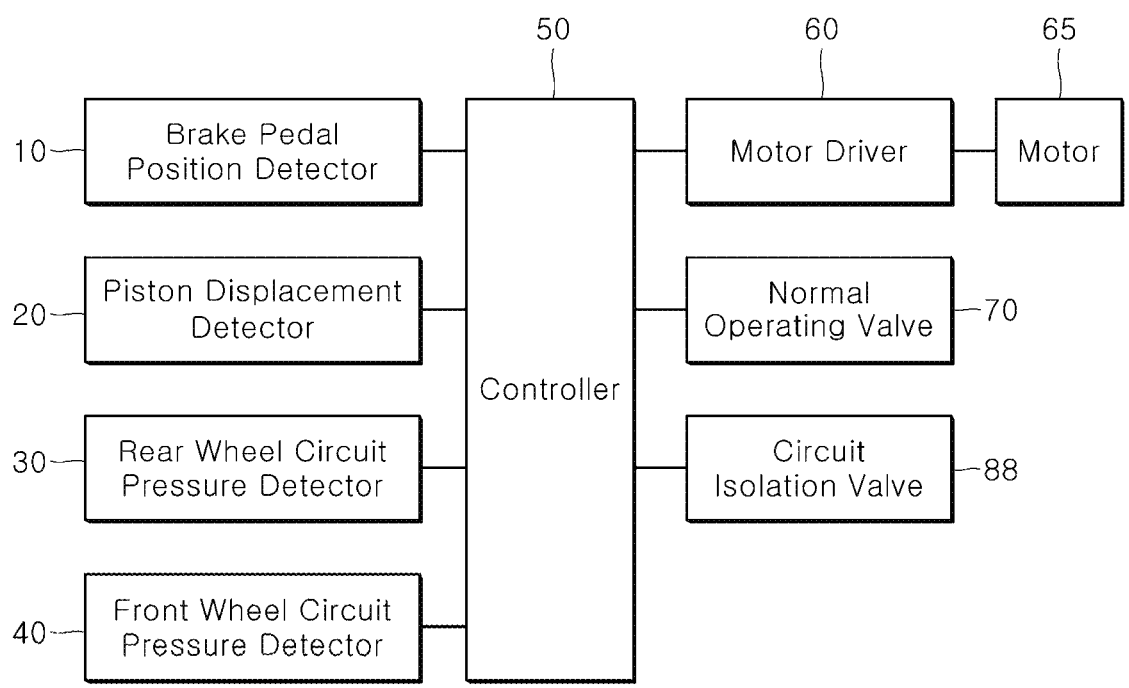
FIG. 1 is a block diagram illustrating a braking apparatus of a vehicle in accordance with an embodiment of the present disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, a braking apparatus of a vehicle and a control method thereof will be described below with reference to the accompanying drawings through various examples of embodiments.

Figure 2:
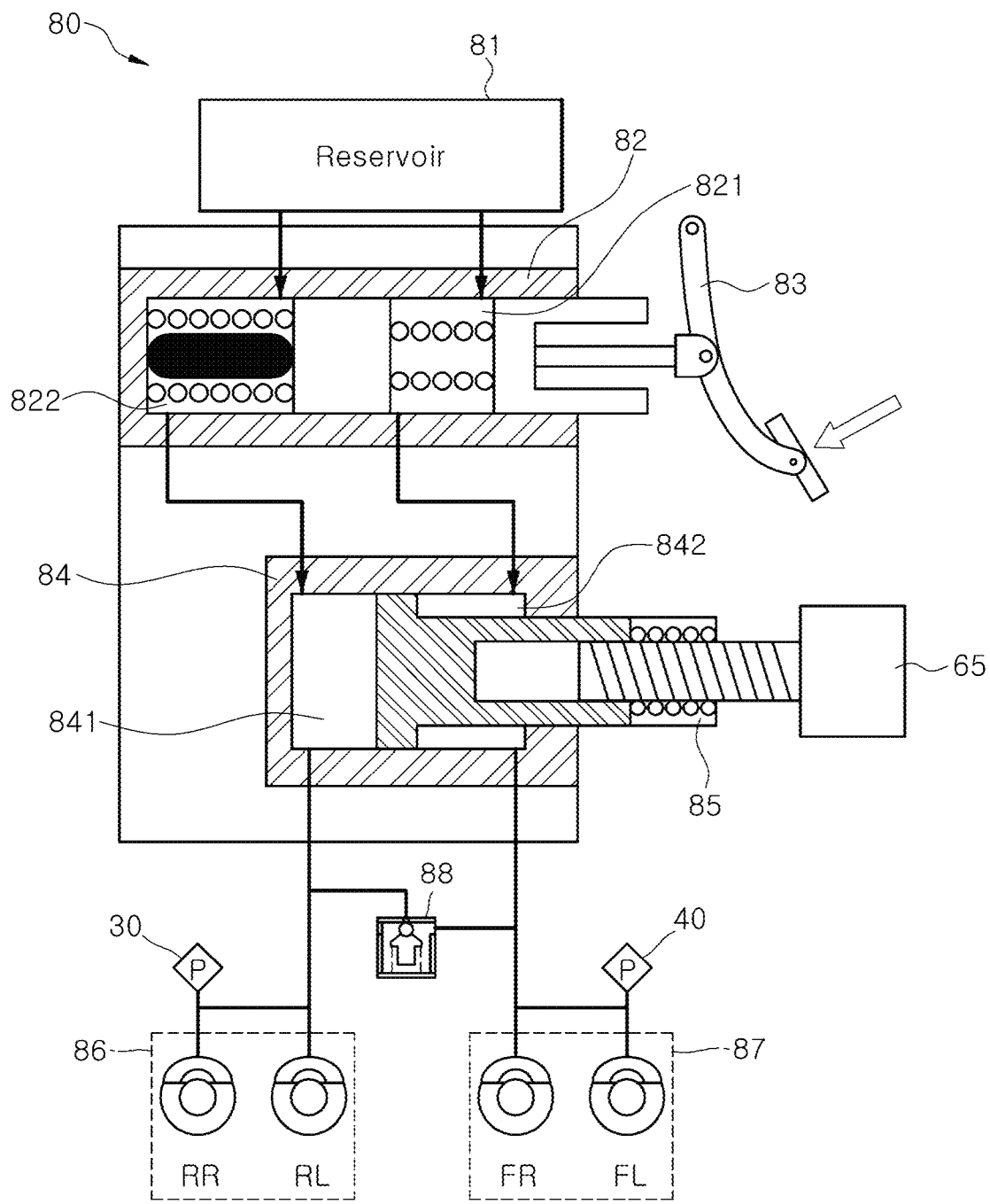
FIG. 2 is a schematic view illustrating an actuator part of an electric-booster brake system to which the braking apparatus of a vehicle in accordance with the embodiment of the present disclosure is applied.
Figure 3:
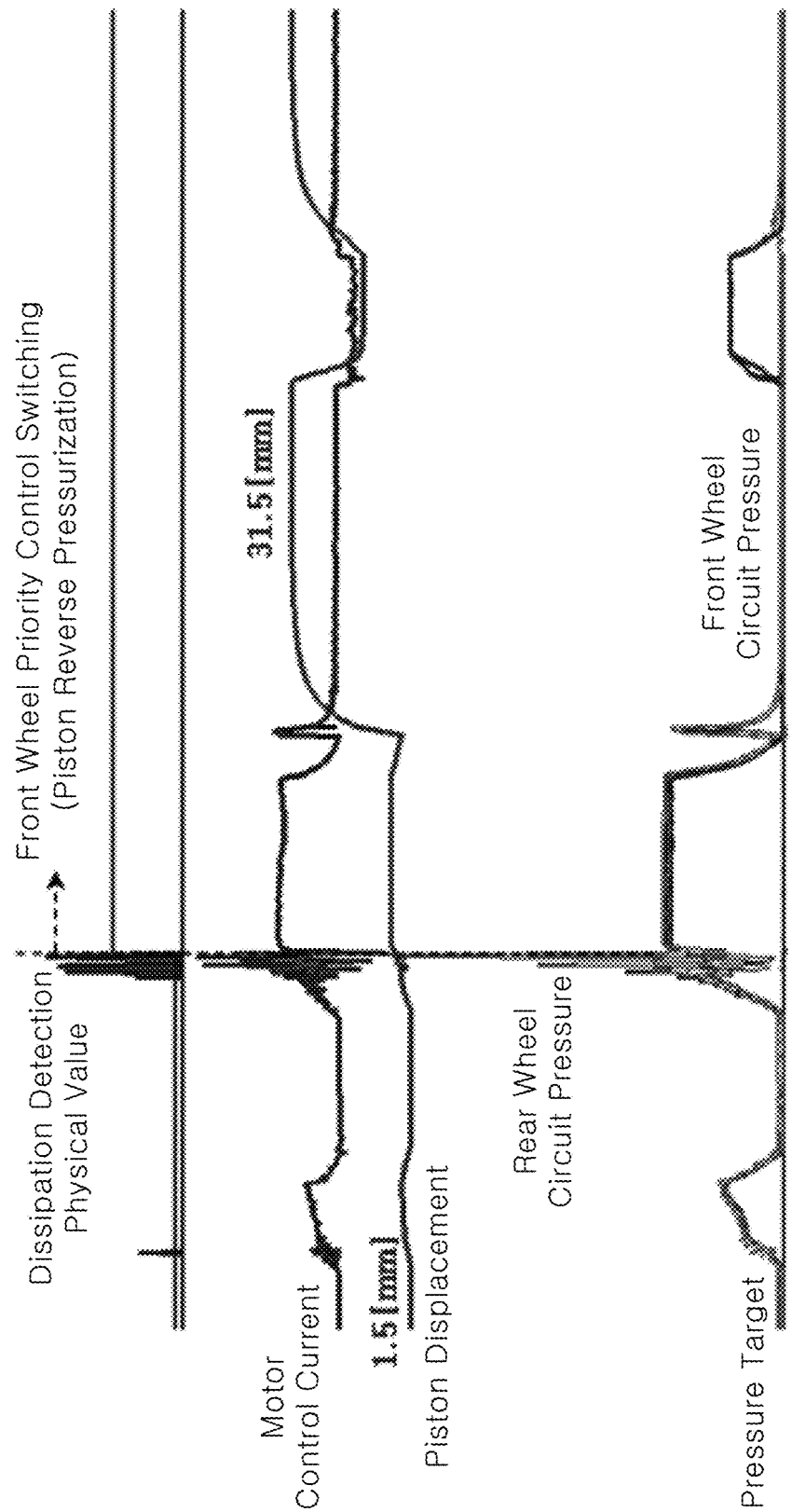
FIG. 3 is a graph illustrating a piston displacement and a pressure change in the braking apparatus of a vehicle in accordance with the embodiment of the present disclosure.

FIG. 1 is a block diagram illustrating a braking apparatus of a vehicle in accordance with an embodiment of the present disclosure, FIG. 2 is a schematic view illustrating an actuator part of an electric-booster brake system to which the braking apparatus of a vehicle in accordance with the embodiment of the present disclosure is applied, and FIG. 3 is a graph illustrating a piston displacement and a pressure change in the braking apparatus of a vehicle in accordance with the embodiment of the present disclosure.

As illustrated in FIGS. 1 to 2, the braking apparatus in accordance with the embodiment of the present disclosure may include a brake pedal position detector 10, a piston displacement detector 20, a rear wheel circuit pressure detector 30, a front wheel circuit pressure detector 40, a motor driver 60 and a controller 50.

The brake pedal position detector 10 may detect the position of a brake pedal 83 and provide the detected position to the controller 50. Thus, the controller 50 may determine a driver's braking intention by determining an operation state of a brake.

The piston displacement detector 20 may detect a displacement of a piston installed in a main master cylinder 84 and provide the detected displacement to the controller 50. Thus, the controller 50 may determine whether the rear wheel circuit pressure is dissipated.

As illustrated in FIG. 2, an actuator part 80 of the electric-booster brake system which is an ESC integrated electric-booster brake system forms brake hydraulic pressure, and supplies the brake hydraulic pressure to a rear wheel circuit 86 and a front wheel circuit 87.

The rear wheel circuit 86 and the front wheel circuit 87 are hydraulic pressure circuits that receive brake hydraulic pressure from the actuator part 80 of the electric-booster brake system and brake front wheels FR and FL and rear wheels RR and RL.

The actuator part 80 may include a ball screw 85 for switching rotational power of a motor 65 into a linear motion, the main master cylinder 84 including a pressure forming piston structure, and an auxiliary master cylinder 82 including a pedal simulator which simulates a step force of the brake pedal 83 like an existing brake system.

Although not illustrated, a reservoir tank 81 may store oil collected from the front wheel circuit 87 and the rear wheel circuit 86, and then supply the stored oil to the auxiliary master cylinder 82 and the main master cylinder 84.

When the brake pedal 83 is pressed by a user, first and second chambers 822 and 821 of the auxiliary master cylinder 82 are compressed, and brake oil is transferred to the rear wheel circuit 86 and the front wheel circuit 87 through third and fourth chambers 841 and 842 of the main master cylinder 84.

Each of the rear wheel circuit 86 and the front wheel circuit 87 may include a flow path and a plurality of solenoid valves. The flow path connects the actuator part 80 to each wheel cylinder in order to supply brake hydraulic pressure, and the plurality of solenoid valves may be installed on the flow path to control the brake pressure supplied through the flow path. The rear wheel circuit 86 and the front wheel circuit 87 may control the solenoid valves to control brake hydraulic pressures supplied to the respective wheel cylinders of the front wheels FR and FL and the rear wheels RR and RL from the actuator part 80 of the electric-booster brake system.

The rear wheel circuit 86 brakes the rear wheels RR and RL by controlling the brake hydraulic pressure supplied from the actuator part 80, and the front wheel circuit 87 brakes the front wheels FR and FL by controlling the brake pressure supplied from the actuator part 80.

A normal operating valve 70 includes a plurality of solenoid valves installed in the rear wheel circuit 86, the front wheel circuit 87 and the electric-booster brake system, and is disposed on the upstream side of the wheel cylinder to control brake hydraulic pressure which is supplied to the wheel cylinder through the auxiliary master cylinder 82 and the main master cylinder 84 from the reservoir tank 81, and returned to the reservoir tank 81.

The rear wheel circuit pressure detector 30 may detect pressure supplied from the rear wheel circuit 86, and provide the detected pressure to the controller 50. Thus, the controller 50 may determine a fail of the circuit isolation valve 88 based on the front wheel circuit pressure.

The front wheel circuit pressure detector 40 may detect pressure supplied to the front wheel circuit 87, and provide the detected pressure to the controller 50. Thus, the controller 50 may determine a fail of a circuit isolation valve 88 based on the front wheel circuit pressure.

The motor driver 60 drives the motor 65 by applying a motor control current to the motor 65 according to a command of the controller 50. For example, the motor driver 60 may drive the motor 65 by applying a motor control current to the motor 65, move the piston installed in the main master cylinder 84 forward and backward in a straight direction, and supply the brake oil of the third and fourth chambers 841 and 842 to the rear wheel circuit 86 and the front wheel circuit 87.

The controller 50 may receive the position of the brake pedal 83 from the brake pedal position detector 10, and receive the displacement of the piston, the rear wheel circuit pressure and the front wheel circuit pressure from the piston displacement detector 20, the rear wheel circuit pressure detector 30 and the front wheel circuit pressure detector 40, respectively, when the brake is operated. Then, the controller 50 determine a fail of the circuit isolation valve 88 that distributes pressure to the front wheel circuit 87 between the rear wheel circuit 86 and the front wheel circuit 87, and then operate the motor driver 60 and the normal operating valve 70 to supply pressure to only one of the rear wheel circuit 86 and the front wheel circuit 87, in order to perform fail safe driving.

The circuit isolation valve 88 may supply pressure to the rear wheel circuit 86 in a normal closed state, and distribute pressure to the front wheel circuit 87, if necessary, such that the pressure can be evenly supplied.

When a closing fail occurs in the circuit isolation valve 88, the rear wheel circuit pressure is dissipated as illustrated in the graph of FIG. 3. The dissipation of the rear wheel circuit pressure occurs when a pressure control gain is so large that the piston vibrates.

When the amount of rear wheel circuit pressure which is formed by the forward movement of the piston falls within a predetermined ratio of a change in pressure of the rear wheel circuit to a change in displacement of the piston in a pressure-controlled situation in which the brake is operated, the ratio of the amount by which the rear wheel circuit pressure is increased to the amount by which the piston is moved forward considerably increases to a predetermined ratio or more, when a closing fail occurs in the circuit isolation valve 88.

Therefore, when the piston is at a forward stroke in the pressure-controlled situation where the brake is operated, the controller 50 may count the number of times that the ratio of the increase in pressure of the rear wheel circuit to the change in displacement of the piston is increased to a threshold value Th_Const or more, and determine whether the rear wheel circuit pressure is dissipated.

When a closing fail occurs in the circuit isolation valve 88, the rear wheel circuit pressure is dissipated, and the front wheel circuit pressure is sensed as a minute amount around 0 bar as the rear wheel circuit pressure fluctuates.

Therefore, the controller 50 may exclude a pressure fluctuation condition (ex. pressure dissipation caused by an increase in viscosity of the brake oil at low temperature) which may unexpectedly occur in the circuit isolation valve 88 in all environments where the brake is operated to perform pressure control, even through a closing fail did not occur. Then, the controller 50 may determine a fail of the circuit isolation valve 88.

As such, when the rear wheel circuit pressure is dissipated and the front wheel circuit pressure is less than a threshold pressure Th_Prs, the controller 50 may determine that a fail occurred in the circuit isolation valve 88.

When a fail occurs in the circuit isolation valve 88 after the fail of the circuit isolation valve 88 is determined, the controller 50 may select any one of the rear wheel circuit 86 and the front wheel circuit 87 to form braking pressure as much as the driver requests, and operate the motor driver 60 and the normal operating valve 70 to form braking pressure only through the corresponding circuit, in order to perform fail safe driving.

The controller 50 may select a circuit which requires a larger amount of brake oil and can generate a larger braking force at the same pressure, between the rear wheel circuit 86 and the front wheel circuit 87, further increase a pressure command to follow a target deceleration, and perform pressure control only through the selected circuit, in order to perform fail safe driving. At this time, since the front wheel can form the deceleration according to the pressure increase more easily than the rear wheel, the controller 50 may perform pressure control only through the front wheel circuit 87, in order to preferentially control the front wheels.

After determining a fail of the circuit isolation valve 88, the controller 50 may generate a fail determination flag to spread the fail state of the circuit isolation valve 88.

As described above, the brake apparatus of a vehicle in accordance with the embodiment of the present disclosure may detect a fail of the circuit isolation valve for distributing hydraulic pressure to the front wheel circuit and the rear wheel circuit in the electric-booster brake system, and perform fail safe driving to improve the braking reliability and performance even when a fail occurred.

Figure 4:
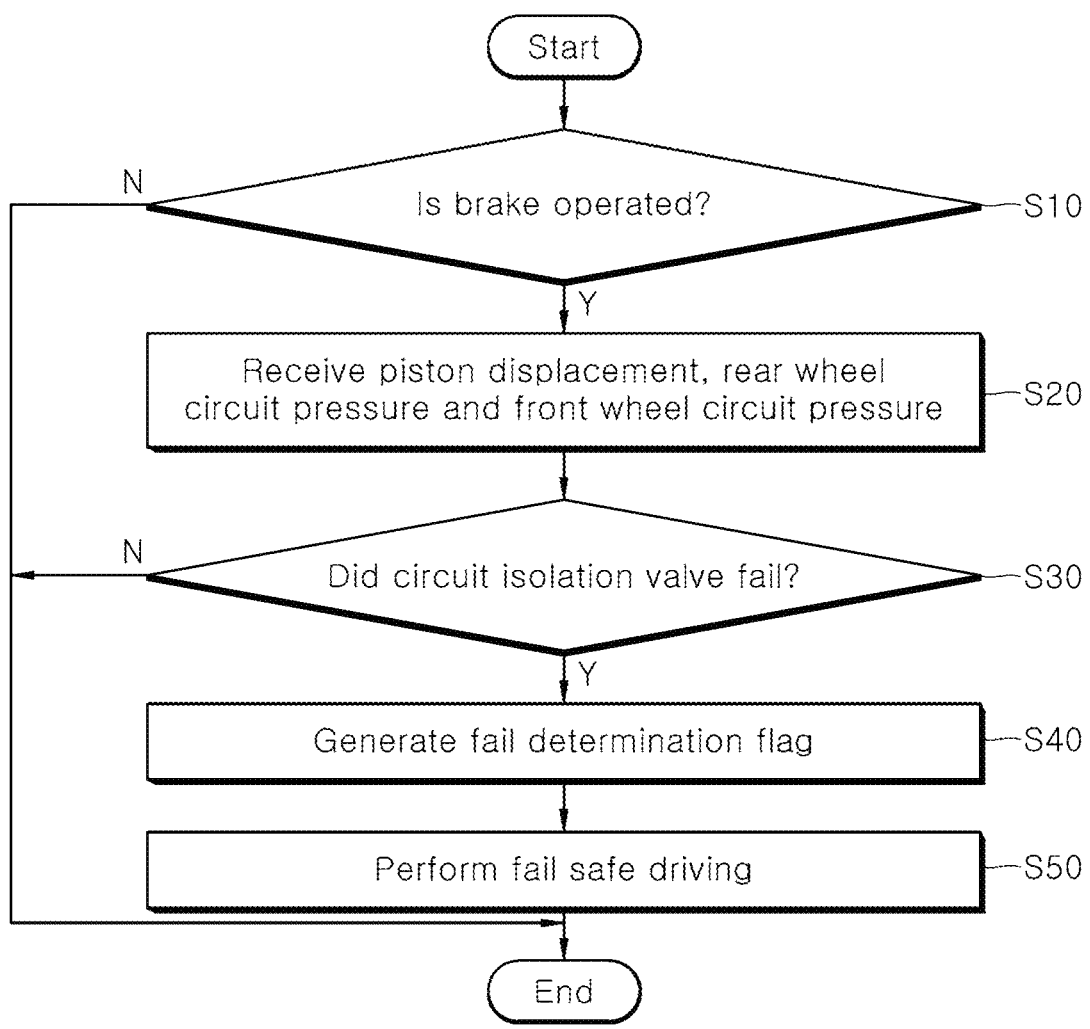
FIG. 4 is a flowchart for describing a control method of a braking apparatus of a vehicle in accordance with an embodiment of the present invention.

FIG. 4 is a flowchart for describing a control method of a braking apparatus of a vehicle in accordance with an embodiment of the present invention.

As illustrated in FIG. 4, the control method of the braking apparatus of a vehicle in accordance with the embodiment of the present disclosure starts with step S10 in which the controller 50 receives the position of the brake pedal 83 and determines an operation state of the brake.

When the determination result of step S10 indicates that the brake is not operated, the process is ended. However, when the determination result indicates that the brake is operated, the controller 50 receives a displacement of the piston, rear wheel circuit pressure and front wheel circuit pressure from the piston displacement detector 20, the rear wheel circuit pressure detector 30 and the front wheel circuit pressure detector 40, respectively, in step S20.

After receiving the displacement of the piston, the rear wheel circuit pressure and the front wheel circuit pressure in step S20, the controller 50 determines a fail of the circuit isolation valve 88 for distributing the pressure to the front wheel circuit 87 between the rear wheel circuit 86 and the front wheel circuit 87, in step S30.

The circuit isolation valve 88 supplies pressure to the rear wheel circuit 86 in a normal closed state, and distributes pressure to the front wheel circuit 87, if necessary, such that the pressure can be evenly supplied.

In step S30, when the piston is at the forward stroke in a pressure-controlled situation where the brake is operated, the controller 50 may count the number of times that the ratio of an increase in pressure of the rear wheel circuit to a change in displacement of the piston is increased to the threshold value Th_Const or more, and determine whether the rear wheel circuit pressure is dissipated.

When a closing fail occurs in the circuit isolation valve 88, the rear wheel circuit pressure is dissipated, and the front wheel circuit pressure is detected as a minute amount around 0 bar as the rear wheel circuit pressure fluctuates.

Therefore, the controller 50 may exclude a pressure fluctuation condition (ex. pressure dissipation caused by an increase in viscosity of the brake oil at low temperature) which may unexpectedly occur in the circuit isolation valve 88 in all environments where the brake is operated to perform pressure control, even through a closing fail did not occur. Then, the controller 50 may determine a fail of the circuit isolation valve 88.

As such, when the rear wheel circuit pressure is dissipated and the front wheel circuit pressure is less than the threshold pressure Th_Prs, the controller 50 may determine that a fail occurred in the circuit isolation valve 88.

When the determination result of step S30 indicates that a fail occurred in the circuit isolation valve 88, the controller 50 may generate a fail determination flag and spread the fail state of the circuit isolation valve 88 in step S40.

After generating the fail determination flag in step S40, the controller 50 selects any one circuit of the rear wheel circuit 86 and the front wheel circuit 87 in order to form braking pressure as much as the driver requests, and operates the motor driver 60 and the normal operating valve 70 to form the braking pressure only through the corresponding circuit, in order to perform fail safe driving, in step S50.

The controller 50 may select a circuit which requires a larger amount of brake oil and can generate a larger braking force at the same pressure, between the rear wheel circuit 86 and the front wheel circuit 87, further increase a pressure command to follow a target deceleration, and perform pressure control only through the selected circuit, in order to perform fail safe driving. At this time, since the front wheel can form the deceleration according to the pressure increase more easily than the rear wheel, the controller 50 may perform pressure control only through the front wheel circuit 87, in order to preferentially control the front wheels.

As described above, the control method of the brake apparatus of a vehicle in accordance with the embodiment of the present disclosure may detect a fail of the circuit isolation valve for distributing hydraulic pressure to the front wheel circuit and the rear wheel circuit in the electric-booster brake system, and perform fail safe driving to improve the braking reliability and performance even when a fail occurred.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A braking apparatus of a vehicle, comprising:
a brake pedal position detector configured to detect a position of a brake pedal;
a piston displacement detector configured to detect a displacement of a piston installed in a main master cylinder;
a first wheel circuit pressure detector configured to detect pressure supplied to a first wheel circuit;
a second wheel circuit pressure detector configured to detect pressure supplied to a second wheel circuit;
a motor driver configured to drive a motor to move the piston; and
a controller configured to:
receive the position of the brake pedal from the brake pedal position detector;
receive the displacement of the piston, the first wheel circuit pressure and the second wheel circuit pressure from the piston displacement detector, the first wheel circuit pressure detector and the second wheel circuit pressure detector, respectively, when a brake is operated;
determine a fail of a circuit isolation valve that distributes pressure between the first wheel circuit and the second wheel circuit; and
perform fail safe driving by operating the motor driver and a normal operating valve to supply pressure to only one of the first wheel circuit and the second wheel circuit,
wherein, when the first wheel circuit pressure is dissipated and the second wheel circuit pressure is less than a threshold pressure, the controller determines that the circuit isolation valve has failed.

2. The braking apparatus of claim 1, wherein the controller counts the number of times that the ratio of an increase in pressure of the first wheel circuit to a change in displacement of the piston is increased to a value equal to or greater than a threshold value with the piston moved forward, and determines whether the first wheel circuit pressure is dissipated.

3. The braking apparatus of claim 1, wherein the controller generates a fail determination flag after determining the fail of the circuit isolation valve.

4. The braking apparatus of claim 1, wherein the circuit isolation valve allows pressure to be applied only to the first wheel circuit in a normal closed state, and allows pressure to be applied to the second wheel circuit when not in a closed state.

5. A control method of a braking apparatus of a vehicle, comprising:
receiving, by a controller, a position of a brake pedal, and determining an operation state of a brake;
determining, by the controller, a fail of a circuit isolation valve for distributing pressure between a first wheel circuit and a second wheel circuit, when the brake is operated; and
performing, by the controller, fail safe driving by operating a motor driver and a normal operating valve such that pressure is supplied to only one of the first wheel circuit and the second wheel circuit, depending on the fail state of the circuit isolation valve,
wherein the determining of the fail of the circuit isolation valve comprises:
receiving, by the controller, a displacement of a piston, first wheel circuit pressure and second wheel circuit pressure from a piston displacement detector, a first wheel circuit pressure detector and a second wheel circuit pressure detector, respectively; and
determining that the circuit isolation valve has failed when the first wheel circuit pressure is dissipated and the second wheel circuit pressure is less than a threshold pressure.

6. The control method of claim 5, wherein the controller counts the number of times that the ratio of an increase in pressure of the first wheel circuit to a change in displacement of the piston is increased to a value equal to or greater than a threshold value with the piston moved forward, and determines whether the first wheel circuit pressure is dissipated.

7. The control method of claim 5, whether the determining of the fail of the circuit isolation valve further comprises generating, by the controller, a fail determination flag after determining the fail of the circuit isolation valve.

8. The control method of claim 5, wherein the circuit isolation valve allows pressure to be applied to the first wheel circuit in a normal closed state, and allows pressure to be applied to the second wheel circuit when not in a closed state.

* * * * *